United States Patent [19]

Sherman

[11] Patent Number: 5,789,823
[45] Date of Patent: Aug. 4, 1998

[54] ELECTRIC HYBRID TRANSMISSION WITH A TORQUE CONVERTER

[75] Inventor: James Francis Sherman, Brighton, Mich.

[73] Assignee: General Motors Corporation, Detroit, Mich.

[21] Appl. No.: 757,648

[22] Filed: Nov. 20, 1996

[51] Int. Cl.$^6$ .................................................. B60L 11/14
[52] U.S. Cl. ........................... 290/47; 290/46; 290/36 R; 180/65.5; 180/65.2; 475/5
[58] Field of Search .................. 290/47, 46, 36 R; 180/65.5, 65.2; 475/5

[56] References Cited

U.S. PATENT DOCUMENTS

| | | | |
|---|---|---|---|
| 5,285,111 | 2/1994 | Sherman | 290/4 C |
| 5,433,282 | 7/1995 | Moroto et al. | 180/65.2 |
| 5,513,719 | 5/1996 | Moroto et al. | 180/65.4 |
| 5,558,173 | 9/1996 | Sherman | 180/53.8 |
| 5,558,175 | 9/1996 | Sherman | 180/65.2 |
| 5,643,119 | 7/1997 | Yamaguchi et al. | 475/5 |
| 5,669,842 | 9/1997 | Schmidt | 475/5 |
| 5,697,466 | 12/1997 | Moroto et al. | 180/65.2 |

Primary Examiner—Steven L. Stephan
Assistant Examiner—Nicholas Ponomarenko
Attorney, Agent, or Firm—Donald F. Scherer

[57] ABSTRACT

A torque converter disposed between a motor/generator and an internal combustion engine during the engine starting procedure and between the motor/generator and a multi-speed transmission as well as between the engine and a multi-speed transmission during vehicle travel. A pair of selectively engageable clutches and a one-way device are incorporated to accomplish the engine start power path, the normal torque converter power path and a converter bypass power path.

1 Claim, 2 Drawing Sheets

5,789,823

ELECTRIC HYBRID TRANSMISSION WITH A TORQUE CONVERTER

TECHNICAL FIELD

This invention relates to electric hybrid power transmissions.

BACKGROUND OF THE INVENTION

Electric hybrid transmissions have a motor/generator, an internal combustion engine and a multi-speed transmission. The transmission is disposed to receive power from the motor/generator and/or the internal combustion engine depending upon the operating condition desired by the operator. The motor/generator is employed to start the internal combustion engine. This is accomplished by imposing a gear reduction unit between the motor/generator and the internal combustion engine to accommodate the low speed high torque requirement otherwise needed by the motor/generator during engine starting. This reduces the size requirement of the motor/generator in the prior art.

In the alternative, a separate starter motor can be employed to enable engine starting. However, this adds to the overall weight of the power transmission.

SUMMARY OF THE INVENTION

A torque converter is positioned in the transmission and provided with selectively engageable clutches to establish a plurality of power paths. A first power path is established between the electric motor generator and the internal combustion engine to enable starting of the engine. A second power path bypasses the torque converter. A third power path provides a continuous connection between the torque converter turbine and a multi-speed power transmission, and a fourth power path is established through a one-way device between the engine, motor/generator and torque converter impeller.

The first power path provides a torque multiplication between the motor/generator and the engine during engine startup without the need for an additional planetary gear set and also permits engine coast braking during normal vehicle operation. The fourth power path enables the engine to supply power directly to the motor/generator and to the vehicle through the torque converter and the transmission.

Accordingly, it is an object of this invention to provide an improved electric hybrid transmission.

DESCRIPTION OF THE PREFERRED EMBODIMENT

Figure 1:
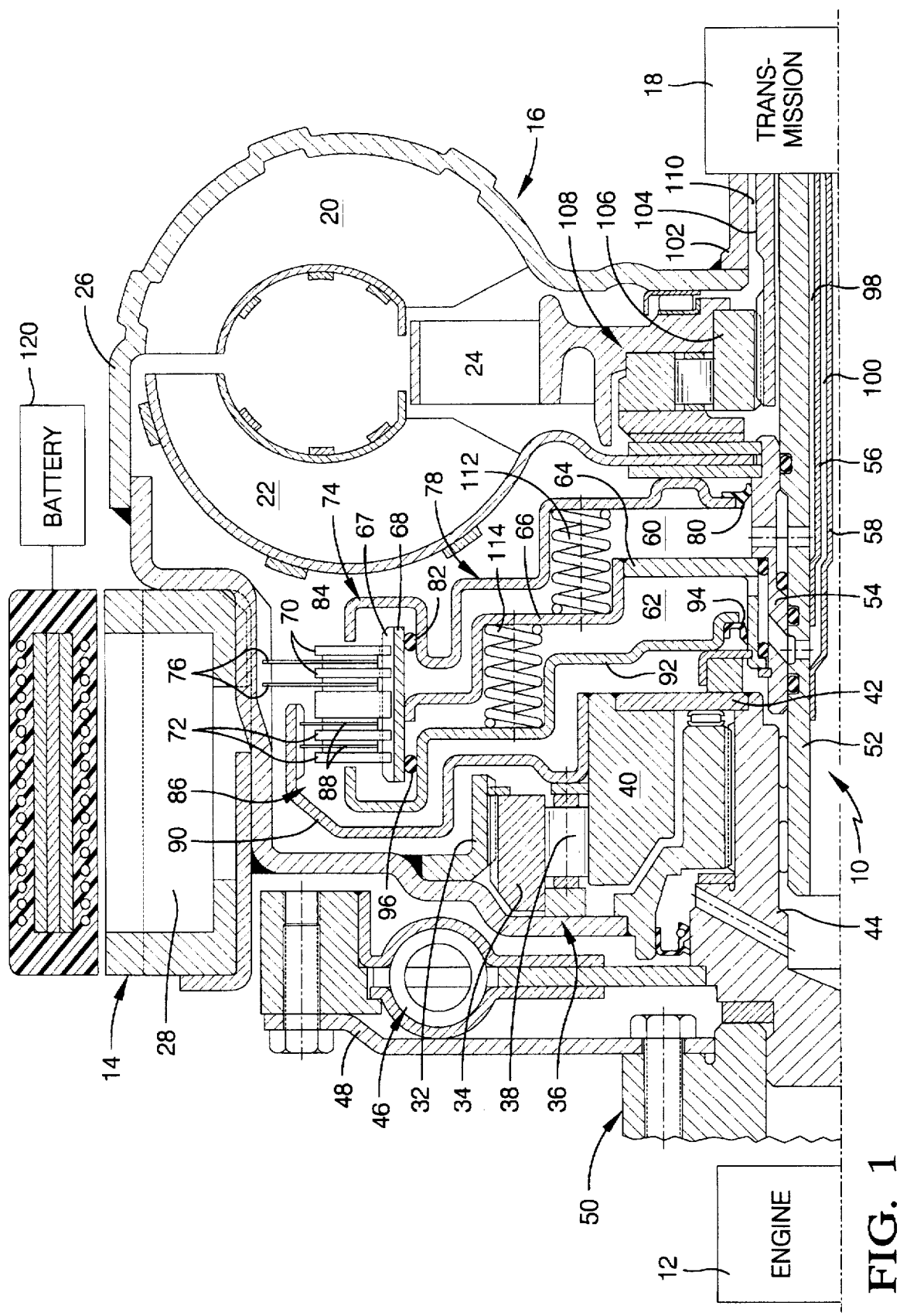
FIG. 1 is a cross-sectional elevational and diagrammatic view of a powertrain incorporating the present invention.

Referring to FIG. 1, there is seen a powertrain generally designated 10, having an engine 12, a motor/generator 14, a torque converter 16 and a multi-speed power transmission 18. The engine 12, motor/generator 14 and multi-speed transmission 18 are conventional items which are well known in the art. The multi-speed transmission 18 provides a number of speed ratios between the engine 12 and a vehicle drive system, not shown. These types of transmissions are well known, such that a more complete description is not warranted at this point.

The torque converter 16 includes a pump or impeller 20, a turbine 22 and a stator 24. The impeller 20 is drivingly connected through an input shell 26 with a rotor 28 of the motor/generator 14. The input shell 26 has a hub portion 32 which is drivingly connected to an outer race 34 of a one-way device 36. The one-way device 36 has a plurality of rollers 38 which are disposed between the outer race 34 and an inner race 40.

In a well known manner, the rollers 38 will permit free rotation between the inner and outer races 34 and 40 during one direction of rotation of the inner or outer race while preventing rotation in the opposite direction. For example, if the inner race 40 is driven clockwise, the outer race 34 will also be drive clockwise. However, if the outer race 34 rotates faster than the inner race in a clockwise direction, no power will be transmitted between the outer race 34 and the inner race 40.

The inner race 40 is secured with an annular plate 42 which, in turn, is drivingly connected to a shaft member 44. The shaft member 44 is drivingly connected through a conventional damper assembly 46 with an engine flywheel 48 which, in turn, is connected with an engine crankshaft 50. Thus, the inner race 40 will rotate whenever the engine 12 is driven or providing power.

The turbine 22 is drivingly connected with a torque converter output shaft 52 through a hub 54. The output shaft 52 has disposed therein a pair of tube members 56 and 58 which are effective to provide fluid passages to a pair of clutch chambers 60 and 62, respectively. The clutch chambers 60 and 62 are separated by a plate 64 and a spring reaction wall 66. The spring reaction wall 66 is secured with a hub 68 on which is disposed, through a tooth or spline connection 67, a plurality of friction plates 70 and 72.

The friction plates 70 are members of a torque converter clutch, generally designated 74, which also includes friction plates 76 which are drivingly connected with the input shell 26. The torque converter clutch 74 also includes an apply piston 78 which has disposed thereon a pair of annular lip seals 80 and 82 which are effective to seal the chamber 60 from a pressure chamber 84 formed between the turbine 22 and the input shell 26.

The friction plates 72 are components of an engine clutch, generally designated 86. The clutch 86 also has friction plates 88 which are spaced between the friction plates 72 and drivingly connected with a hub 90. The hub 90 is secured to the inner race 40 and is open to the pressure in the chamber 84. The clutch 86 also has an apply piston 92 which includes a pair of annular lip seals 94 and 96 which are effective to provide a seal relationship between the chamber 62 and the chamber 84.

The tube 56 cooperates with the shaft 52 to form a passage 98 which selectively supplies pressure to the chamber 60. Tube 58 cooperates with the tube 56 and shaft 52 to form a passage 100 which selectively supplies fluid pressure to the chamber 62. The fluid pressure supplied to the chambers 60 and 62 is provided through a conventional control system (not shown) in which a valve member admits fluid pressure to the chamber or exhaust fluid pressure from the chamber. These types of devices are, of course, well known in the transmission art.

The torque converter pump 20 has a hub 102 which is spaced from a stator shaft 104. The stator shaft 104 is grounded to a stationary element, such as a housing, and carries an inner race 106 of a one-way device 108 which is operatively connected with the stator 24. The space between the stator shaft 104 and hub 102 provide a passage 110 through which converter charge pressure is admitted to the torque converter 16. When charge pressure is admitted to the torque converter 16 through passage 110, the same pressure is available in the chamber 84. The pressure in chamber 84 operates on the pistons 78 and 92 to cause engagement of their respective friction plates 70,76 and 72,88. The piston 78, when pressurized, must overcome the force in return springs 112 while the piston 92 must overcome the force in return springs 114. Thus, the clutches 74 and 86 are engaged in a well known manner.

To disengage the clutch 74, fluid pressure is admitted through the passage 98 to the chamber 60 to cooperate with the return springs 112 and thereby disengage the clutch 74 through movement of the piston 78. The clutch 86 is disengaged by fluid pressure being admitted through passage 100 to the chamber 62 which will cooperate with the springs 114 to disengage the piston 92 of the clutch 86.

The transmission 18 includes a conventional positive displacement pump (not shown) which is effective to supply the fluid pressure, via the control system, to the various components both in the transmission and in the torque converter chamber. The torque converter impeller 20 can be driven by the motor/generator 14 through rotation of the rotor 28. When this occurs, the hydraulic pump of the transmission 18 will be rotated to provide fluid pressure to control the actuation of various clutches and brakes in the transmission as well as actuation of the clutches 74 and 86.

The transmission 18 has a neutral condition which will not permit power to transmit to the vehicle output shaft. With the transmission in neutral, the motor/generator 14 can be operated such that fluid pressure can be supplied to the torque converter 16 in chamber 84 so that the clutch 86 is energized and pressure is supplied to the passage 98 so that the clutch 74 is disengaged. With this arrangement, the turbine 22 will cause rotation of the clutch 86 which, in turn, will cause rotation of the crankshaft 50 of the engine 12. This will permit starting of the engine.

During the initial acceleration of the rotor 28, the torque converter 16 will assume a stalled condition in which the impeller 20 is rotated at the speed of the rotor 28 while the turbine 22 is stationary and applying torque to the engine crankshaft 50. During the acceleration of the impeller 20, the torque converter 16 will develop sufficient torque to begin rotation of the crankshaft 50 thereby causing the engine 12 to rotate at a speed sufficient to permit starting. Once the engine is started, the clutch 86 can be disengaged and the engine 12 can be accelerated to its idle speed. At this point, the engine 12 will drive the inner race 40 which, in turn, will cause rotation of the outer race 34 should the outer race be rotating at a speed less than the speed of the inner race. However, if the rotor 28 continues to rotate faster than the engine, the one-way device 36 will permit overrunning or freewheeling between the engine 12 and the rotor 28.

The motor/generator 14 receives power from a battery 120, such that starting of the engine can be accomplished. The schematic or diagrammatic components of FIGS. 2 and 3 have been given the same numerical designations as their corresponding components in FIG. 1.

Figure 2:
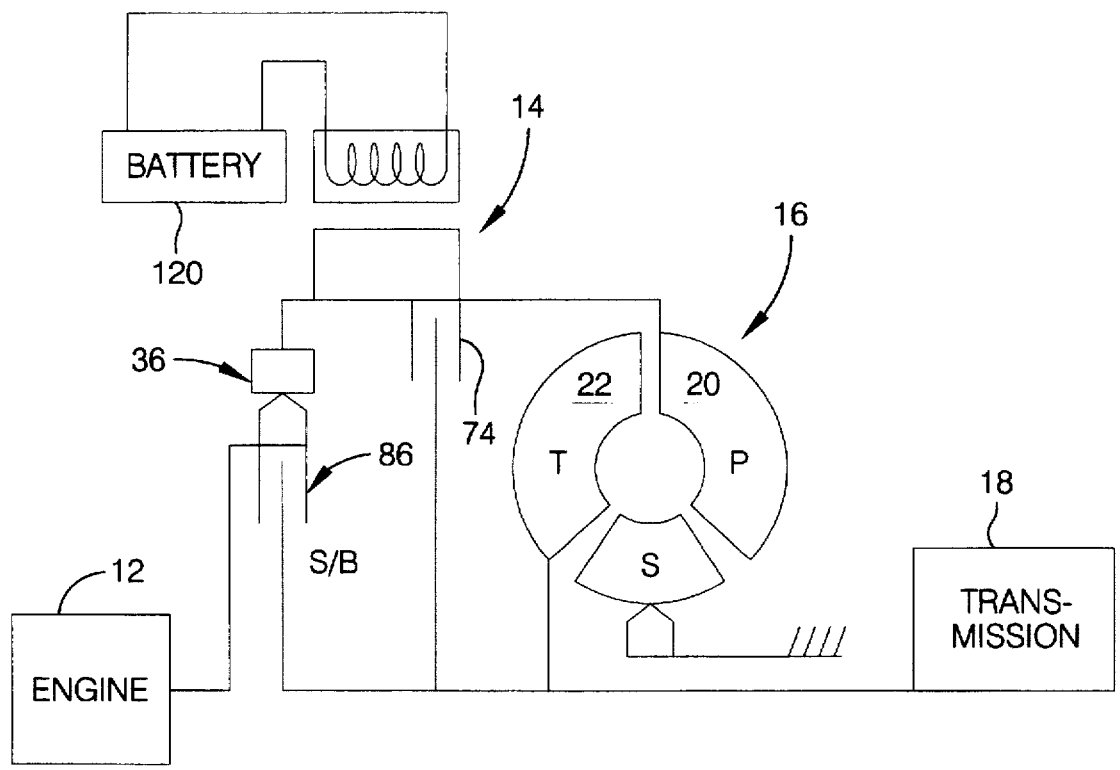
FIG. 2 is a schematic representation of the powertrain shown in FIG. 1.
Figure 3:
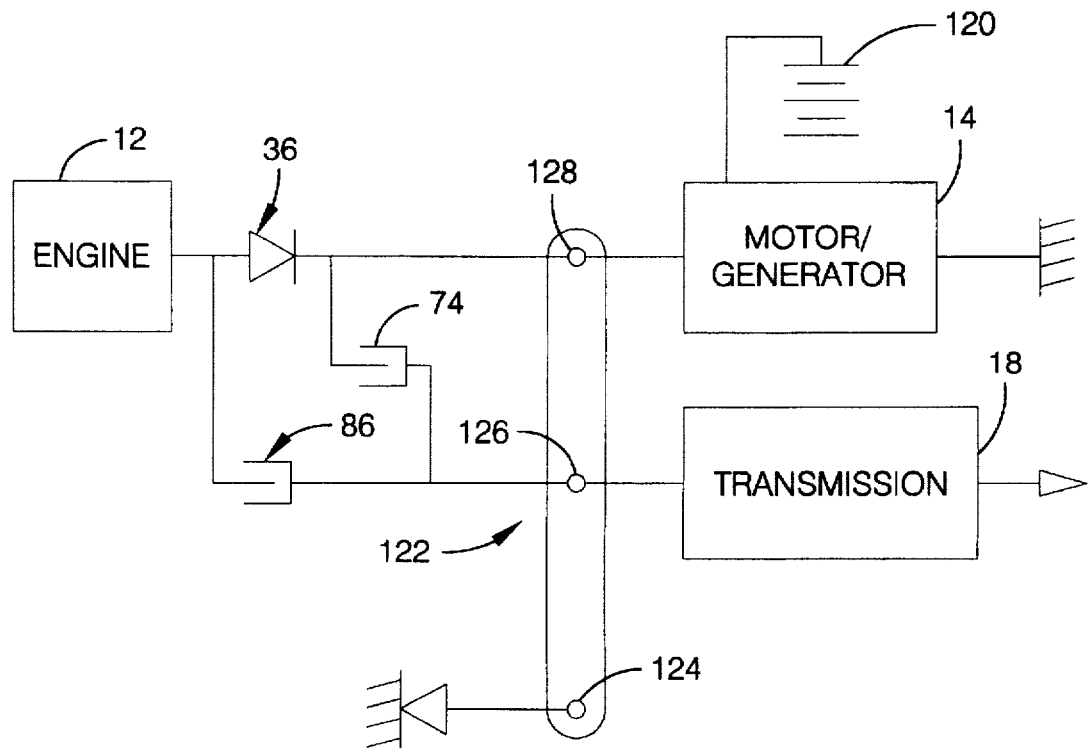
FIG. 3 is a lever diagram of the powertrain shown in FIG. 1.

In viewing FIG. 2, it can be seen that when the turbine 22 is rotated through the torque multiplication of the torque converter and the clutch 86 is engaged, the engine 12 will be driven from the motor/generator through the torque converter to provide starting, as previously explained. When this is viewed in FIG. 3, it can be seen that the motor/generator 14 will cause the torque converter 16, represented by a lever arm 122, to react at the stator represented by point 124 and cause the turbine represented by point 126 to move in the same direction as the impeller represented by point 128 on the lever 122.

It should be appreciated that due to the lever arm 122, the speed of the turbine will be less than the speed of the impeller 20, but the torque will be multiplied thereby providing a low speed high torque input through the clutch 86 to the engine 12. When the engine has been started, the clutch 86 is disengaged and the engine can supply power through the one-way device 36. With the engine driving through the one-way device 36, the impeller 20 will be driven by the engine 12 such that full power can be transmitted through the torque converter to the transmission 18. In this situation, the torque converter 16, when viewed as a lever arm in FIG. 3, will again supply a torque multiplier between the engine and the transmission 18 until the torque converter reaches a coupling stage which is essentially a 1:1 transmission member.

When this occurs, the torque converter clutch 74 can be engaged thereby providing a direct power path between the outer race 34 of the one-way device 36, the rotor 28 and the torque converter turbine 22. Thus, a 1:1 drive to the transmission 18 is provided in bypassing relation with the torque converter. This drive can be either from the motor/generator 14 or from the engine 12 through the one-way device 36.

If it is desirable to provide coast braking or engine braking, as it is commonly termed, the clutch 86 can be engaged which will provide a direct drive connection between the engine 12 and the automatic transmission 18. The clutch 86 can also be engaged during conventional operation so that the transmission and the rotor 28 of the motor/generator 14 are driven by the engine 12. This will permit the motor/generator 14 to charge the battery 120 while supplying electrical power to other devices or accessories of the vehicle.

Also, the motor/generator 14 can supplement the engine power, if desired, during times of peak power requirements by the vehicle. The important feature to appreciate is that the torque converter permits the motor/generator 14 to be of a more conventional sized high speed low torque unit and still permit engine starting without the use of an integral planetary gear arrangement providing the gear reduction. The torque converter 16 also provides the standard or conventional duty of a torque converter, that is, providing a multiplier between the prime mover and the transmission.

I claim:

1. An electric hybrid powertrain comprising:

a motor/generator;

an internal combustion engine;

a torque converter having an input impeller, a stator and an output turbine;

a one-way drive mechanism disposed between said motor/generator and said internal combustion engine for permitting power flow from said internal combustion engine to said motor/generator and preventing reverse power flow; and a selectively engageable friction clutch mechanism for selectively connecting said internal combustion engine with said output turbine for receiving power therefrom, said motor/generator being continuously drivingly connected with said input impeller, said clutch mechanism being engaged and said motor/generator driving said input impeller for delivering power through said torque converter to start said internal combustion engine.

* * * * *